(12) United States Patent
Yoshimura

(10) Patent No.: US 8,454,446 B2
(45) Date of Patent: Jun. 4, 2013

(54) DAMPER MECHANISM

(75) Inventor: Yoshinari Yoshimura, Ikoma (JP)

(73) Assignee: EXEDY Corporation, Osaka (JP)

( * ) Notice: Subject to any disclaimer, the term of this patent is extended or adjusted under 35 U.S.C. 154(b) by 46 days.

(21) Appl. No.: 13/121,104

(22) PCT Filed: Sep. 10, 2009

(86) PCT No.: PCT/JP2009/065853

§ 371 (c)(1),
(2), (4) Date: Mar. 25, 2011

(87) PCT Pub. No.: WO2010/047193

PCT Pub. Date: Apr. 29, 2010

(65) Prior Publication Data

US 2011/0177869 A1    Jul. 21, 2011

(30) Foreign Application Priority Data

Oct. 24, 2008   (JP) ................................. 2008-274897

(51) Int. Cl.
*F16D 3/12* (2006.01)

(52) U.S. Cl.
USPC ........................................................ 464/68.1

(58) Field of Classification Search
USPC ..................... 464/68.1, 68.4, 68.41; 192/212, 192/213.12, 214, 214.1
See application file for complete search history.

(56) References Cited

U.S. PATENT DOCUMENTS

| 4,739,866 | A |   | 4/1988 | Reik et al. |
| 5,697,846 | A | * | 12/1997 | Uenohara .................... 464/64.1 |
| 5,778,738 | A |   | 7/1998 | Takabayashi et al. |
| 5,848,937 | A |   | 12/1998 | Mizukami et al. |
| 2010/0178991 | A1 |   | 7/2010 | Hada et al. |

FOREIGN PATENT DOCUMENTS

| JP | 59-166723 A | 9/1984 |
| JP | 09-072382 A | 3/1997 |
| JP | 09-196078 A | 7/1997 |
| JP | 10-196729 A | 7/1998 |
| JP | H10-196729 A | 7/1998 |
| WO | WO-2008-041634 A1 | 4/2008 |

OTHER PUBLICATIONS

Chinese Office Action of the corresponding Chinese Application No. 200980142395.6, dated Sep. 21, 2012.

* cited by examiner

*Primary Examiner* — Gregory Binda
(74) *Attorney, Agent, or Firm* — Global IP Counselors, LLP

(57) ABSTRACT

A damper mechanism for a clutch includes a first rotary body, a second rotary body, and an elastic member. The first rotary member includes a first member, a second member, and first and second connecting sections. The second rotary body is configured between the first and second members in an axial direction and rotatably configured relative to the first rotary body. The elastic member is rotatably configured between the first and second connecting sections to connect the first and second rotary bodies elastically. The second rotary body includes first and second protruding sections being arranged between the first and second connecting sections such that the first and second protruding sections contact the connecting sections. The first member includes a pair of first holes being configured with the rotational axis between the first holes for positioning pins being inserted in the first holes during an assembly.

7 Claims, 13 Drawing Sheets

DAMPER MECHANISM

TECHNICAL FIELD

CROSS-REFERENCE TO THE RELATED APPLICATIONS

This U.S. National Stage Application claims priority under 35 U.S.C. §119 (a) to Japanese Patent Application No.2008-274897 filed in Japan on Oct. 24, 2008. The entire content of Japanese Patent Application No.2008-274897 is hereby incorporated herein by reference.

The present invention relates to a damper mechanism, particular a damper mechanism for damping torsional vibrations in a power train.

BACKGROUND ART

A damper mechanism is used in a power train of a vehicle to dampen torsional vibrations. A clutch device contrived to transmit and block transmission of a torque from an engine is will now be explained as an example.

The clutch device has a clutch disk assembly arranged close to a flywheel and a clutch cover assembly for pushing the clutch disk assembly against the flywheel. The clutch disk assembly functions both as a clutch and as a damper.

The clutch cover assembly has an annular clutch cover fixed to the flywheel, a pressure plate provided such that it can move in an axial direction with respect to the clutch cover and can rotate as an integral unit with the clutch cover, and a diaphragm spring arranged to apply a spring load forcing the pressure plate toward the flywheel.

The clutch disk assembly has a clutch disk sandwiched between the pressure plate and the flywheel, a pair of input plates arranged facing opposite each other and fixed to the clutch disk, a hub flange arranged axially between the pair of input plates, a coil spring serving to elastically couple the pair of input plates and the hub flange together in a rotational direction, and an output hub elastically coupled to the hub flange in a rotational direction. The pair of input plates, the hub flange, and the coil spring constitute a damper mechanism.

A conventional clutch disk assembly uses a stop pin as a member to restrict relative rotation between the input plates and the hub flange to within a prescribed torsional angle. The stop pin connects the pair of input plates together and passes through a hole formed in the hub flange. Contact between stop pin and the hole in a rotational direction constitutes a stopper mechanism.

However, the stop pin requires a certain diameter in order to have sufficient strength and it is necessary to arrange the stop pin farther inward in a radial direction than an outer circumferential edge of the pair of input plates. Consequently, the relative torsional angle between the pair of input plates and the hub flange cannot be made sufficiently large. Even if a coil spring with a high degree of stiffness is used, a sufficient relative torsional angle cannot be obtained. Thus, with a conventional stop pin type stopper mechanism, the full capacity of coil spring cannot be utilized.

Therefore, a damper mechanism employing a stopper mechanism that does not use a stop pin has been proposed Japanese Laid-open Patent Publication No. 9-196078 discloses such damper mechanism for example.

SUMMARY

It is difficult to establish an attachment angle of the hub flange with respect to the input plate when this type of damper mechanism is assembled and, consequently, the efficiency of the work of assembling the damper mechanism is degraded.

An object of the present invention is to provide a damper mechanism with which the work of assembling the damper mechanism can be accomplished with a higher degree of efficiency.

A damper mechanism according to the present invention comprises a first rotary body, a second rotary body, and a plurality of elastic members. The first rotary body has a first member, a second member arranged axially adjacent to the first member, and a plurality of connecting sections connecting the first member and the second member together. The second rotary body is arranged axially between the first and second members and rotatably arranged relative to the first rotary body. The elastic members are arranged rotationally between the connecting sections to connect the first and second rotary bodies together elastically in a rotational direction. The second rotary body has a pair of protruding sections arranged rotationally between the connecting sections such that they can touch against the connecting sections in a rotational direction. The first member has a pair of first holes arranged opposite each other in such positions that a rotational axis is disposed there-between. The two first holes are configured such that a positioning pin used during assembly can be inserted therein and arranged to be closely adjacent to the pair of protruding sections in a rotational direction.

With this damper mechanism, since the first holes into which the positioning pin can be inserted are arranged closely adjacent to the protruding sections in a rotational direction, the second rotary body can be easily set to a correct position with respect to the first member by installing the protruding sections with respect to the first member such that the positioning pins touch against the protruding sections in a rotational direction. In this way, the work of assembling the damper mechanism can be accomplished with increased efficiency.

DETAILED DESCRIPTION OF EXEMPLARY EMBODIMENTS

An embodiment of a damper mechanism according to the present invention will now be explained based on the drawings. The embodiment presents an example in which a damper mechanism is installed in a clutch disk assembly

[1. Overall Configuration of Clutch Disk]Assembly

Figure 1:
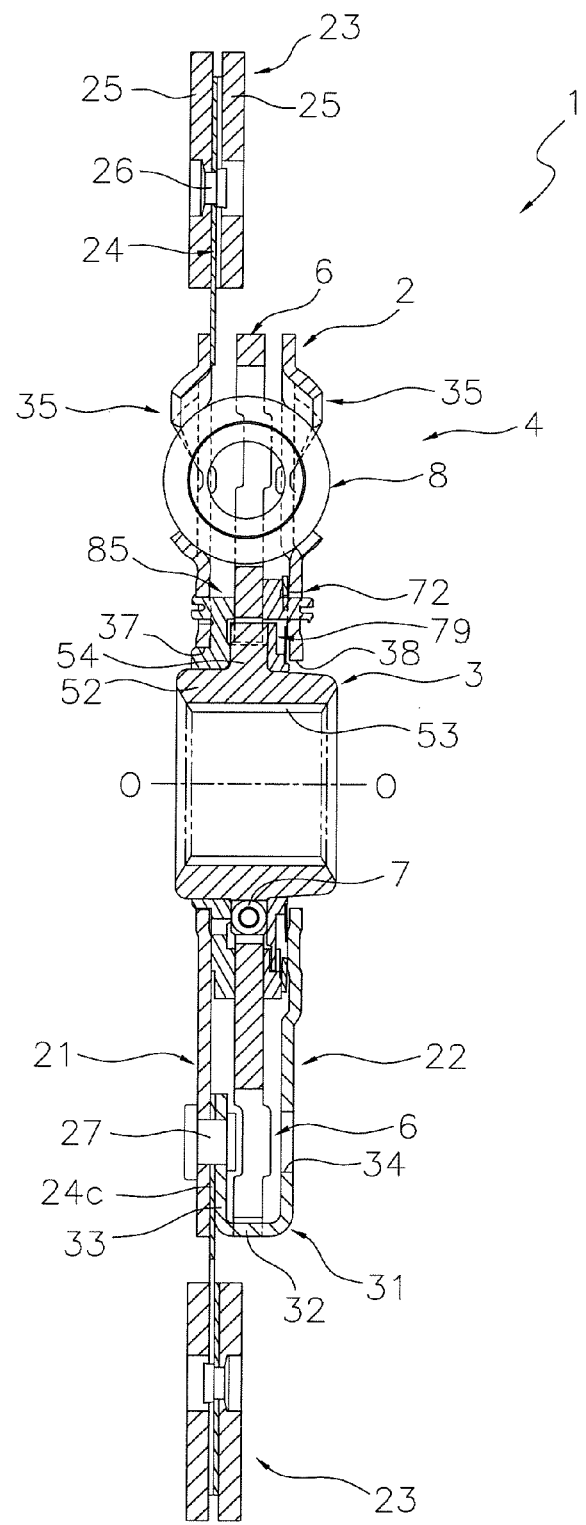
FIG. 1 is a vertical cross sectional schematic view of a clutch disk assembly.
Figure 2:
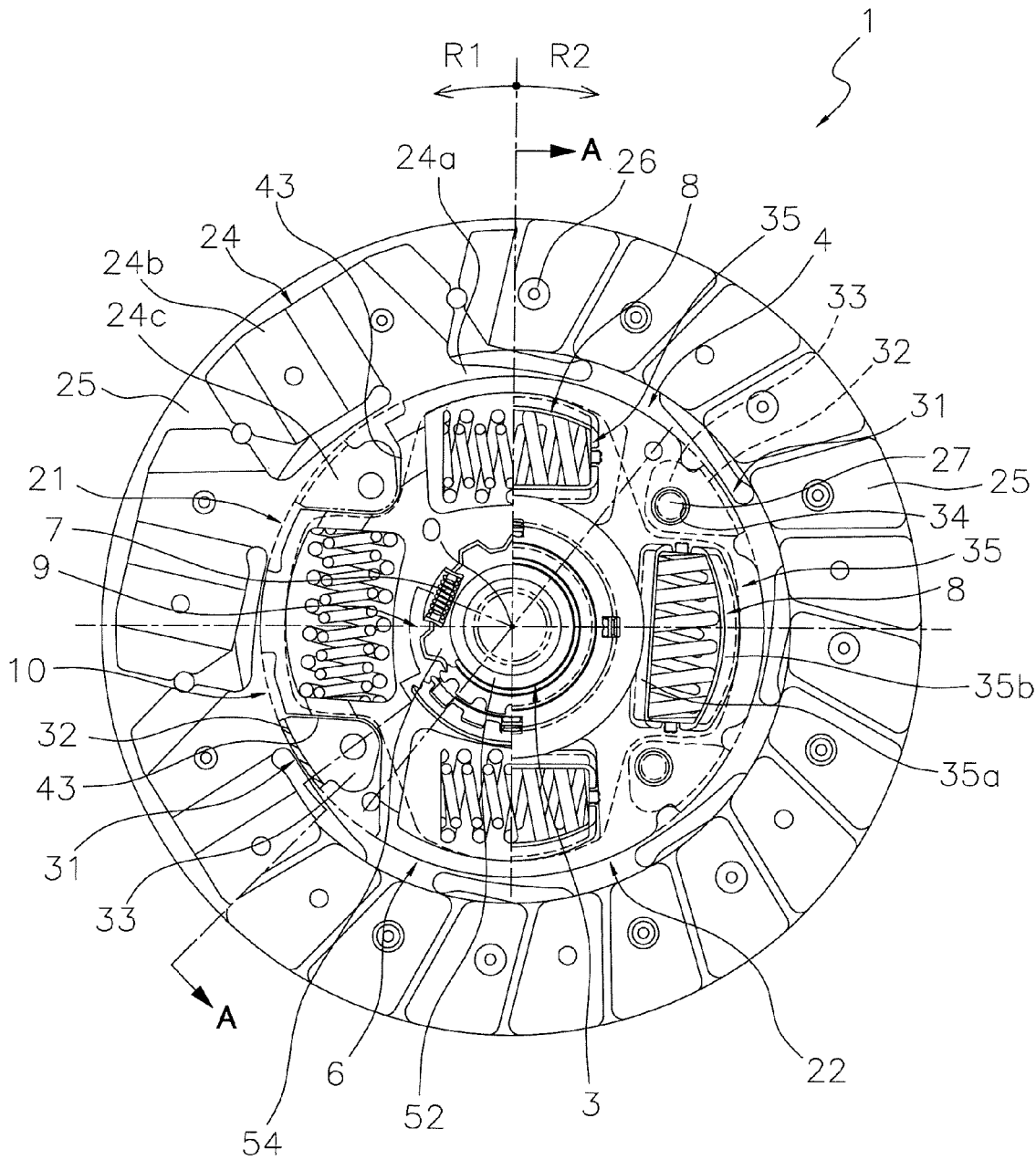
FIG. 2 is a schematic plan view of a clutch disk assembly.

A clutch disk assembly 1 equipped with a damper mechanism 4 according to the present invention will now be explained with reference to FIGS. 1 and 2. FIG. 1 is a vertical cross sectional schematic view of the clutch disk assembly 1 and FIG. 2 is a schematic plan view of the clutch disk assembly 1. The line O-O in FIG. 1 is a rotational axis of the clutch disk assembly 1. An engine and a flywheel (not shown) are arranged on a left-hand side of FIG. 1 and a transmission (not shown) is arranged on a right-hand side of FIG. 1. In FIG. 2, R1 indicates a rotational drive direction (positive direction) of the clutch disk assembly 1 and R2 indicates an opposite direction (negative direction) of the same.

The clutch disk assembly 1 is a mechanism used in a clutch device of a power train of a vehicle and functions both as a clutch and as a damper mechanism. The clutch disk assembly 1 functions as a clutch by being pressed against the flywheel (not shown) by a pressure plate or being released from the flywheel such that a torque is transmitted or blocked from being transmitted. The clutch disk assembly 1 functions as a damper mechanism by absorbing and attenuating torsional vibrations imparted from flywheel side using a coil spring or the like.

As shown in FIGS. 1 and 2, the clutch disk assembly 1 comprises chiefly a clutch disk 23 to which a torque is imparted from the flywheel and a damper mechanism 4 contrived to absorb and attenuate torsional vibrations imparted from the clutch disk 23.

The clutch disk 23 is a portion that is pressed against the flywheel (not shown) and comprises chiefly an annular pair of friction facings 25 and a cushioning plate 24 to which the friction facing 25 is fixed. The cushioning plate 24 is fixed to an outer circumferential portion of the damper mechanism 4. The cushioning plate 24 will be explained later in more detail.

[2. Constituent Features of Damping Mechanism]

Figure 3:
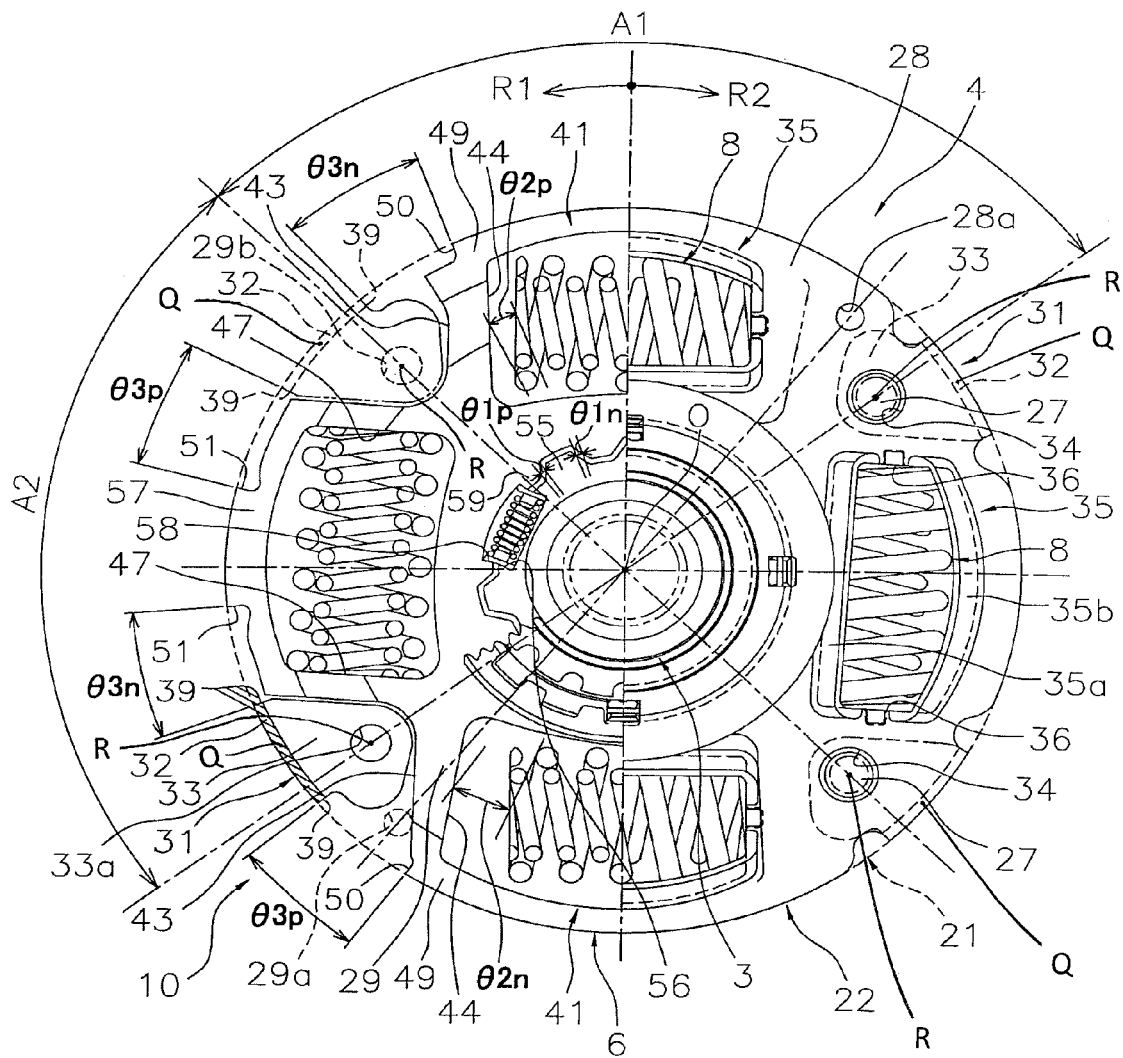
FIG. 3 is a schematic plan view of a damper mechanism.
Figure 4:
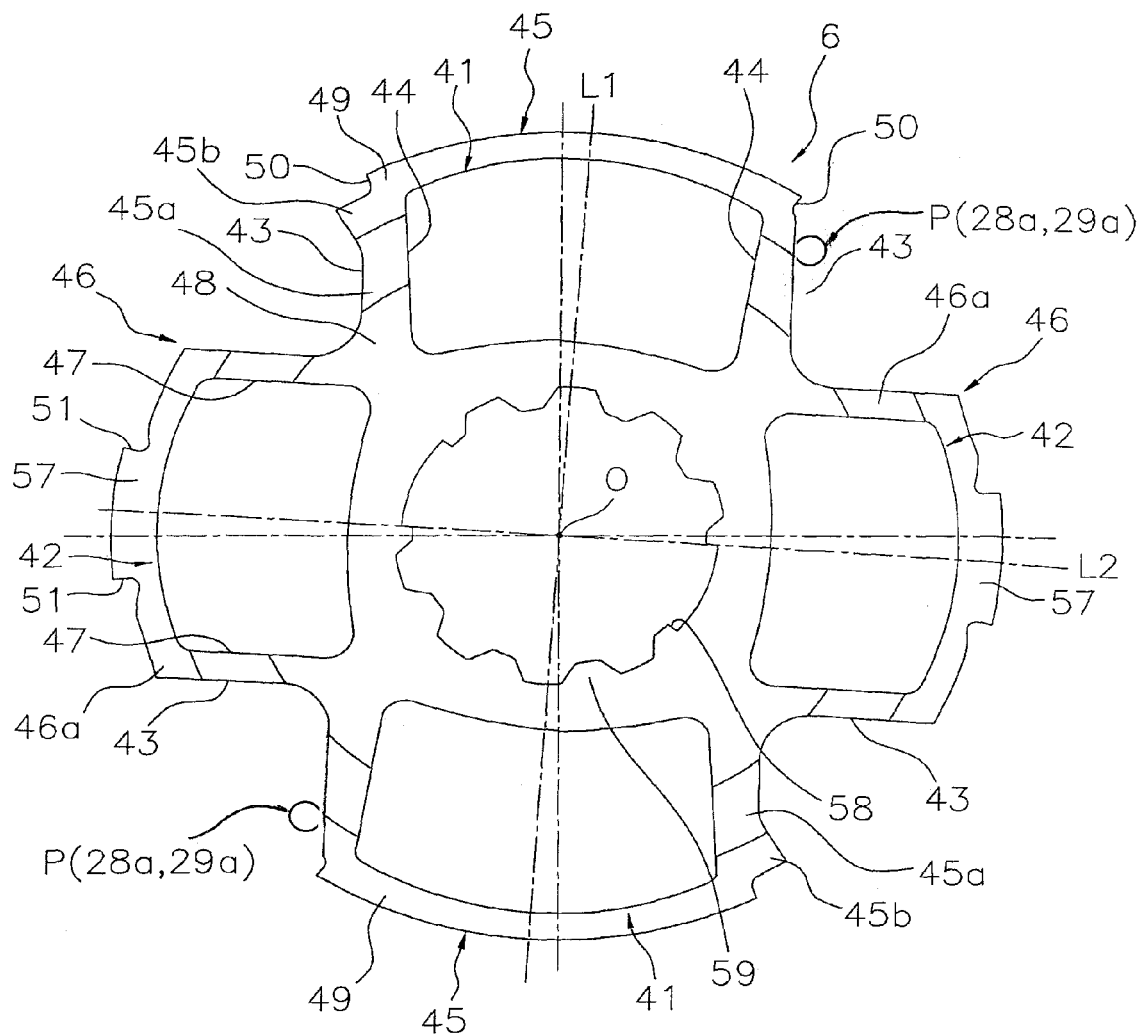
FIG. 4 is a plan view of a hub flange.
Figure 5:
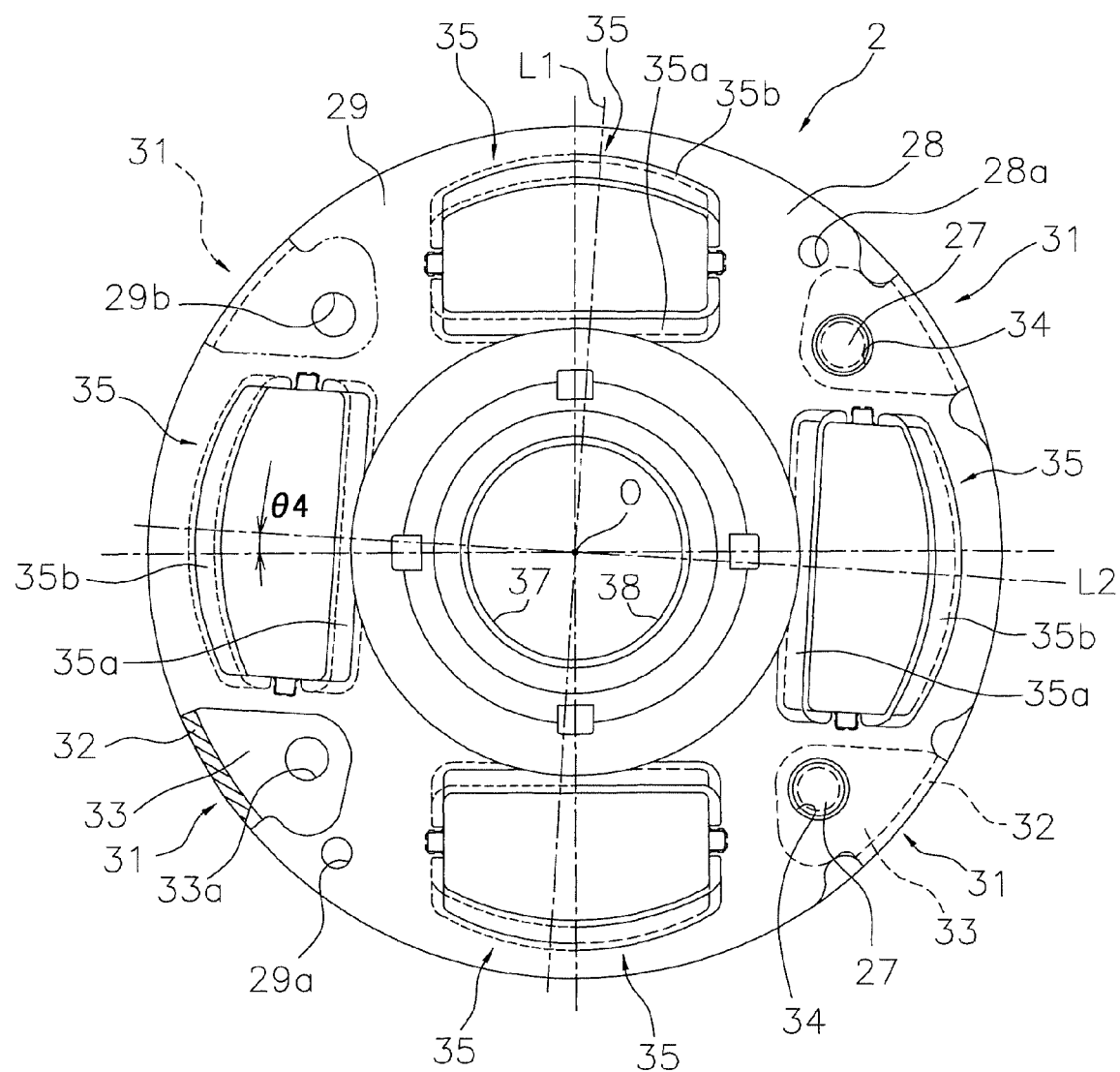
FIG. 5 is a plan view of an input rotary body.
Figure 6:
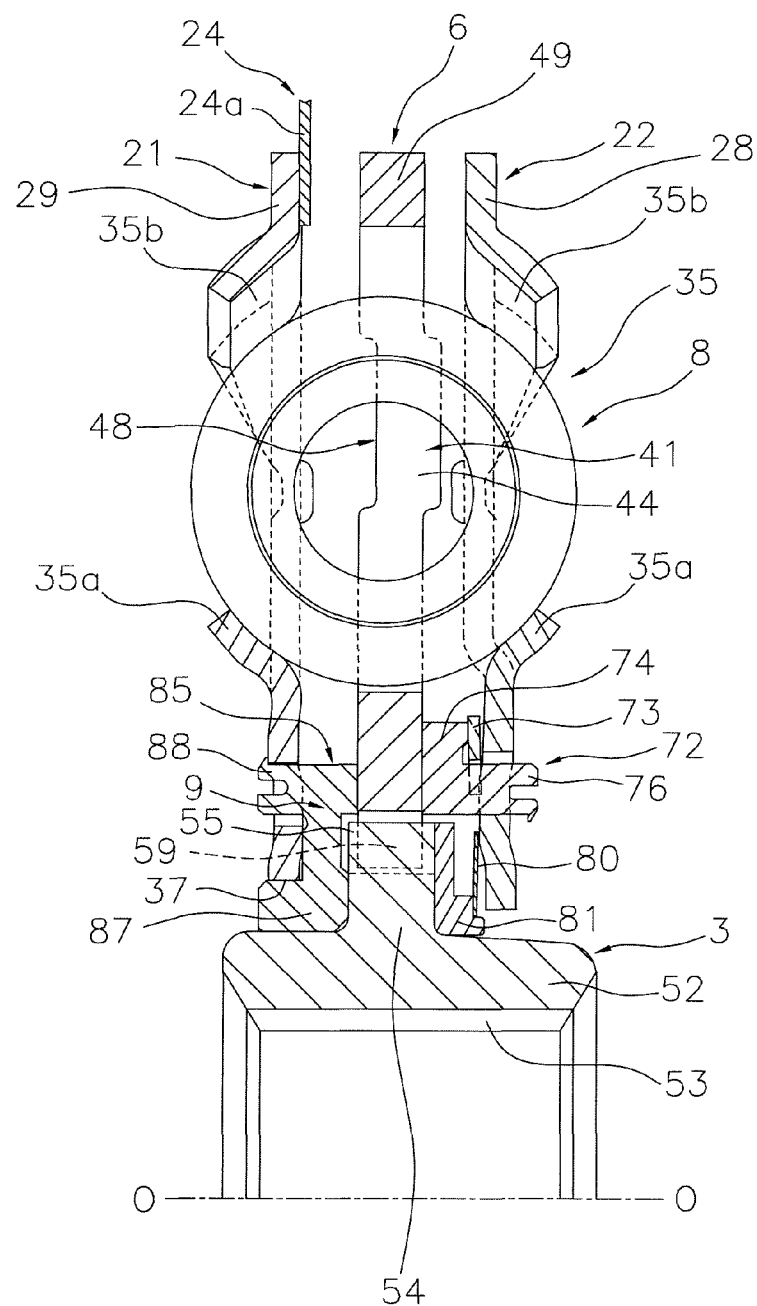
FIG. 6 is a partial cross sectional view of a damper mechanism.
Figure 7:
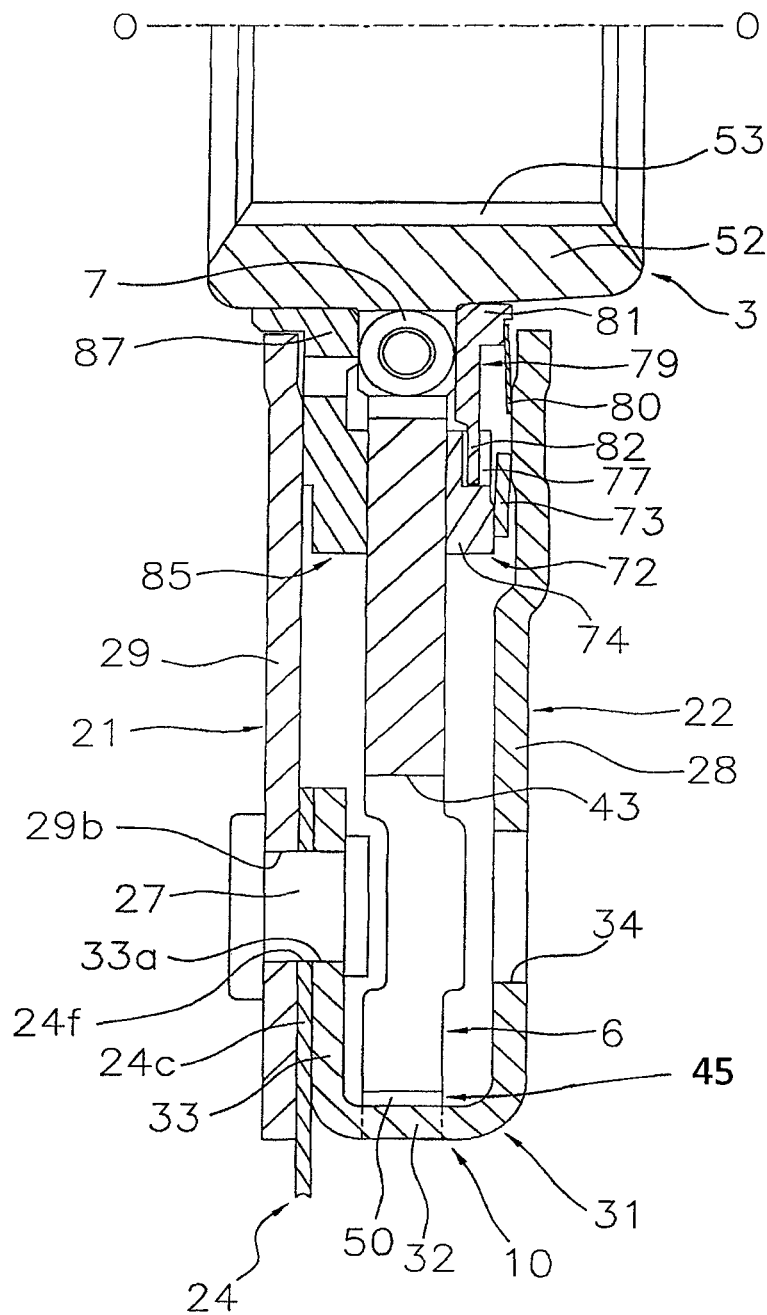
FIG. 7 is a partial cross sectional view of a damper mechanism.

The parts making up the damper mechanism 4 will now be explained in detail with reference to FIGS. 3 to 7. FIG. 3 is a schematic plan view of the damper mechanism 4, FIG. 4 is a plan view of a hub flange 6, FIG. 5 is a plan view of an input rotary body 2, and FIGS. 6 and 7 are partial cross sectional views of the damper mechanism 4.

The damper mechanism 4 comprises chiefly an input rotary body 2 (example of a first rotary body) fixed to the clutch disk 23, a hub flange 6 (example of a second rotary body) arranged such that it can rotate with respect to the input rotary body 2, a spline hub 3 arranged such that it can rotate with respect to the hub flange 6, a first coil spring 7 connecting the hub flange 6 and the spline hub 3 together elastically in a rotational direction, and a second coil spring 8 (example of an elastic member) connecting the input rotary body 2 and the hub flange 6 together elastically in a rotational direction. The spline hub 3 spline-engages with an end portion of an input shaft of the transmission (not shown).

The input rotary body 2 has a clutch plate 21 and a retaining plate 22. The clutch plate 21 and the retaining plate 22 are circular disk-shaped or annular members made of a metal plate material and are arranged with a prescribed axial-direction spacing in-between. The clutch plate 21 is arranged on an engine side and the retaining plate 22 is arranged on a transmission side. The clutch plate 21 and the retaining plate 22 are fixed together with connecting sections 31. The clutch plate 21 and the retaining plate 22 are thus provided such that they can rotate as an integral unit while maintaining a prescribed axial spacing with respect to each other. A first fastening section 24c and a second fastening section 24e of the clutch disk 23 are fastened to an outer circumferential portion of the clutch plate 21 with rivets 27.

The clutch plate 21 and the retaining plate 22 function to hold second coil springs 8. More specifically, the retaining plate 22 has an annular first body section 28 (example of a first member), four cut and raised sections 35a, and four cut and raised sections 35b. The clutch plate 21 has a second body section 29 (example of a second member), two cut and raised sections 35a, two cut and raised sections 35b, and four connecting sections 31. The cut and raised sections 35a and 35b form holding sections 35 contrived to hold the second coil springs 8 such that the second coil springs can undergo elastic deformation. The connecting sections 31 are arranged between the holding sections 35 along a rotational direction.

The cut and raised sections 35a and 35b are provided at radially inner and radially outer sides of the holding sections 35. The cut and raised sections 35a and 35b serve to restrict movement of the second coil springs 8 in an axial direction and a radial direction. A dimension of a holding section 35 in a rotational direction is substantially the same as a length of a second coil spring 8. A contact surface is formed on both rotational-direction-facing ends of each of the holding sections 35, and the contact surfaces in contact with or in close proximity to the ends of the second coil springs 8. The four holding sections 35 are arranged such that adjacent pitches between the holding sections are different (see FIG. 5). More specifically, the left and right holding sections 35 shown in FIG. 5 are offset by an angle θ4 with respect to the upper and lower holding sections 35.

The first body section 28 has four holes 34 and a pair of first holes 28a arranged opposite each other in such positions that a rotational axis O is disposed there-between. The holes 34 are for inserting the rivets 27 through, and an internal diameter of the holes 34 is slightly larger than an external diameter of a head section of the rivets 27.

The first holes 28a are holes into which positioning pins P (see FIG. 4) are inserted during assembly and each is arranged on the R1 side of a hole 34. An internal diameter of the first holes 28a and an external diameter of the positioning pins P are set to be substantially the same such that the retaining plate 22 does not move with respect to the positioning pins P when the positioning pins P have been inserted into the first holes 28a. The first holes 28a are arranged closely adjacent to first protruding sections 45 along a rotational direction. More specifically, the first holes 28a are arranged such positions that when the damper mechanism 4 is in a neutral state with no power being imparted, a profile borderline of each of the first holes 28a is tangent to a profile borderline of a rotational-direction-facing end portion (more specifically, an edge portion facing in the R2 direction) of each of the first protruding sections 45 (explained later) of the hub flange 6. Consequently, the hub flange 6 can be set to a position where it is in a neutral state with respect to the retaining plate 22 by installing the hub flange 6 such that the positioning pins P touch against the first protruding sections 45.

The second body section 29 has four holes 29b and a pair of second holes 29a arranged opposite each other in such positions that the rotational axis O is disposed there-between. The second holes 29a are holes into which positioning pins P are inserted during assembly and are arranged in such positions that they face opposite the first holes 28a in an axial direction. An internal diameter of the second holes 29a and an external diameter of the positioning pins P are set to be substantially the same such that the clutch plate 21 does not move with respect to the positioning pins P when the positioning pins P have been inserted into the second holes 29a.

The second holes 29a are arranged between the connecting sections 31 and the first protruding sections 45 along a rotational direction. The second holes 29a are arranged closely adjacent to first protruding sections 45 along a rotational direction. More specifically, the second holes 29a are arranged such positions that when the damper mechanism 4 is in a neutral state with no power being imparted, a profile borderline of each of the second holes 29a is tangent to a profile borderline of a rotational-direction-facing end portion (more specifically, an edge portion facing in the R2 direction) of each of the first protruding sections 45.

The connecting sections 31 are arranged on an outer periphery of the first body section 28 and serve to connect the first body section 28 to the second body section 29. More specifically, each of the connecting sections 31 has a contacting section 32 that extends from an outer circumferential edge of the first body section 28 in an axial direction toward the second body section 29 and a fastening section 33 that extends from an end portion of the contacting section 32 in a radially inward direction (see FIG. 7). The connecting sections 31 are formed as integral portions of the first body section 28. Each of the fastening sections has a hole 33a for inserting a rivet 27. The fastening sections 33 are fastened to the second body section 29 of the clutch plate 21 along with the fastening sections 24c of the clutch disk 23 by the rivets 27.

The hub flange 6 is arranged between the clutch plate 21 and the retaining plate 22 such that it can undergo relative rotation and elastically connected to the clutch plate 21 and the retaining plate 22 by the second coil springs 8. More specifically, as shown in FIG. 4, the hub flange 6 has an annular section 48, the pair of first protruding sections 45, a pair of second protruding sections 46, a pair of first window holes 41, and a pair of second window holes 42.

The first protruding sections 45 are portions protruding radially outwardly from the annular section 48 and arranged opposite each other in such positions that the rotational axis O is disposed there-between. The two first protruding sections 45 are configured to be point-symmetrical with respect to the rotational axis O.

Each of the first protruding sections 45 has a first protruding section body 45a in which a first window hole 41 is formed, a projection 45b that protrudes in a rotational direction from the first protruding section body 45a, and a first contacting section 49 that protrudes radially outward from the first protruding section body 45a. The first contacting section 49 can touch against a contacting section 32 of a connecting section 31. A pair of stopper surfaces 50 is formed on rotational-direction-facing end portions of the first contacting section 49. The stopper surfaces 50 can touch against stopper surfaces 39 of the connecting sections 31. As shown in FIG. 4, the projection 45b is arranged farther inward in a radial direction than the first contacting section 49. The projection 45b is arranged in such a position that it would overlap a portion of the second hole 29a if, for example, the hub flange 6 were attached with its front and back sides inverted with respect to the second body section 29. The projection 45b is also arranged in such a position that it would overlap a portion of the first hole 28a if, for example, the hub flange 6 were attached with its front and back sides inverted with respect to the second body section 29.

The second protruding sections 46 are portions protruding radially outwardly from the annular section 48 and arranged opposite each other in such positions that the rotational axis O is disposed there-between. The two second protruding sections 46 are configured to be point-symmetrical with respect to the rotational axis O.

Each of the second protruding sections 46 has a second protruding section body 46a in which a second window hole 42 is formed and a second contacting section 57 that protrudes radially outwardly from the second protruding section body 46a. The second contacting section 57 can touch against a contacting section 32 of a connecting section 31. A pair of stopper surfaces 51 is formed on rotational-direction-facing end portions of the first contacting section 57. The stopper surfaces 51 can touch against stopper surfaces 39 of the connecting sections 31.

Four notches 43 in which the connecting sections 31 are arranged are formed rotationally between the first protruding sections 45 and the second protruding sections 46. A first centerline L1 serves as a radial centerline dividing the first protruding sections 45 in a rotational direction. A second centerline L2 serves as a radial centerline dividing the second protruding sections 46 in a rotational direction. The first centerline L1 intersects the second centerline L2 perpendicularly.

The pair of first window holes 41 and the pair of second window holes 42 are arranged in positions corresponding to the four holding sections 35. The two first window holes 41 are arranged opposite each other along a radial direction, and the two second window holes 42 are arranged opposite each other along a radial direction.

The second coil springs 8 are housed in the first window holes 41 and the second window holes 42. A rotational direction dimension of a first window hole 41 is set to be longer than a holding section 35, and a rotational direction dimension of a second window hole 42 is set to be substantially the same as that of a holding section 35. First contact surfaces 44 are formed on both circumferentially facing ends of each of the first window holes 41, second contact surfaces 47 are formed on both circumferentially facing ends of each of the second window holes 42, and the contact surfaces 44 and 47 are arranged to contact or be in close proximity to the end portions of the second coil springs 8.

A spline hub 3 is arranged inside a center hole 37 of the clutch plate 21 and a center hole 38 of the retaining plate 22. The spline hub 3 has a cylindrical boss 52 that extends in an axial direction and a flange 54 that extends in a radially outward direction from the boss 52. A spline hole 53 configured to engage with the input shaft (not shown) of the transmission is formed in an inner circumferential portion of the boss 52.

As shown in FIG. 3, external teeth 55 formed on an external circumferential portion of the flange 54 are meshed with internal teeth 59 formed on an internal circumferential portion of the hub flange 6. First notches 56 and second notches 58 serving to house the first coil springs 7 are formed in an outer circumferential edge of the flange 54 and an inner circumferential edge of the hub flange 6. A pair of seat spring seats attached to the ends of each of the first coil springs 7. When the coil springs 7 are not compressed, gaps exist between the external teeth 55 and the internal teeth 59 in a rotational direction. Torsional angles corresponding to these gaps are depicted as gap angles $\theta 1p$ and $\theta 1n$. The gap angle $\theta 1p$ corresponds to the gaps formed on the R1 sides of the external teeth 55, and the gap angle $\theta 1n$ corresponds to the gaps formed on the R2 sides of the external teeth 55.

Each of the second coil springs 8 comprises a pair of coil springs having different diameters and arranged coaxially. The second coil springs 8 are longer and larger in diameter than the first coil springs 7. A spring constant of the second coil springs 8 is set to a larger value than a spring constant of the first coil springs 7. Thus, the second coil springs 8 are much stiffer than the first coil springs 7. Consequently, when a torque is imparted to the input rotary body 2, the first coil springs 7 begin to be compressed between the hub flange 6 and the spline hub 3 and the second coil springs 8 begin to be compressed between the input rotary body 2 and the hub flange 6 when the hub flange 6 and the spline hub 3 rotate as an integral unit.

As explained previously, when a torque is inputted to the input rotary body 2, the torque is transmitted to the hub flange 6 through the second coil springs 8 and the hub flange 6 and the spline hub 3 undergo relative rotation. As a result, the first coil springs 7 are compressed between the hub flange 6 and the spline hub 4. When a relative torsional angle between the hub flange 6 and the spline hub 3 reaches a prescribed angle, the external teeth 55 and the internal teeth 59 contact each other and the two members 6 and 3 rotate as an integral unit, thus causing the input rotary body 2 and the hub flange 6 to rotate relative to each other. As a result, the second coil springs 8 are compressed between the input rotary body 2 the hub flange 6. Thus, torsional vibrations imparted from the clutch disk 23 to the input rotary body 2 are absorbed and attenuated. The first coil springs 7 operate in parallel with each other and the second coil springs 8 operate in parallel with each other.

(2.2 Stopper Mechanism)

Since a torque imparted to the input rotary body 2 is transmitted directly, the damper mechanism 4 is provided with a first stopper 9 and a second stopper 10 functioning as stopper mechanisms.

The first stopper 9 is a mechanism for limiting relative rotation of the hub flange 6 and the spline hub 3 to within a prescribed range and comprises the external teeth 55 of the spline hub 3 and the internal teeth 59 of the hub flange 6. The first stopper 9 permits relative rotation between the hub flange 6 and the spline hub 3 within a range of the gap angles $\theta 1p$ and $\theta 1n$.

The second stopper 10 is a mechanism for limiting relative rotation of the input rotary body 2 and the hub flange 6 to within a prescribed range and is constituted by the connecting sections 31 of the input rotary body 2 and the first contacting sections 49 and second contacting sections 57 of the hub flange 6.

In the neutral state shown in FIG. 3, the a gap exists between the connecting sections 31 and the first and second contacting sections 49 and 57 in a rotational direction. Torsional angles corresponding to these gaps are depicted as gap angles $\theta 3p$ and $\theta 3n$. The gap angle $\theta 3p$ corresponds to the gaps formed on the R1 sides of the connecting sections 31, and the gap angle $\theta 3n$ corresponds to the gaps formed on the R2 sides of the connecting sections 31. The second stopper 10 permits relative rotation between the input rotary body 2 and the hub flange 2 within a range of the gap angles $\theta 3p$ and $\theta 3n$.

(2.3 Friction Generating Mechanism)

In order to absorb and attenuate torsional vibrations effectively, the damper mechanism 4 is provided with a friction generating mechanism 5 contrived to generate a hysteresis torque using a frictional resistance. More specifically, the friction generating mechanism 5 has a first friction washer 79, a second friction washer 72, and a third friction washer 85.

The first friction washer 79 is arranged axially between the flange 54 of the spline hub 3 and an inner circumferential portion of the retaining plate 22 so as to be radially outward of the boss 52. The first friction washer 79 is made of resin. The first friction washer 79 comprises chiefly an annular main body 81 and a plurality of projections 82 that extend radially outward from the main body 81.

The main body 81 touches against a transmission-side surface of the flange 54, and a first cone spring 80 is arranged between the main body 81 and the retaining plate 22. The first cone spring 80 is compressed in an axial direction between the main body 81 and the retaining plate 22. Consequently, a friction surface of the first friction washer 79 is pressed against the flange 54 by the first cone spring 80. The projections 82 engage with recessed sections 77 (explained later) of the second friction washer 72. As a result, the first friction washer 79 and the second friction washer 72 can rotate as an integral unit.

The second friction washer 72 is arranged between an inner circumferential portion of the spline hub 6 and an inner circumferential portion of the retaining plate 22 so as to be radially outward of the first friction washer 79. The second friction washer comprises chiefly an annular main body 74, a plurality of engaging sections 76 extending toward the transmission from an inner circumferential portion of the main body 74, and recessed sections 77 formed in an inner circumferential portion of a transmission side of the main body 74. The second friction washer 72 is made of, for example, resin.

The main body 74 touches against a transmission-side surface of the hub flange 6, and a second cone spring 73 is arranged between the main body 74 and the retaining plate 22. The second cone spring 73 is compressed between the main body 74 and the retaining plate 22. Consequently, a friction surface of the second friction washer 72 is pressed against the hub flange 6 by the second cone spring 73. The engaging sections 76 pass through hole portions of the retaining plate 22. As a result, the second friction washer 72 and the retaining plate 22 can rotate as an integral unit. The projections 82 of the first friction washer 79 engage with the recessed sections 77. As a result, the first friction washer 79 can rotate as an integral unit with the retaining plate 22 through its engagement with the second friction washer 72.

A spring force of the first cone spring 80 is designed to be smaller than a spring force of the second cone spring 73. The first friction washer 79 has a lower coefficient of friction than the second friction washer 72. A friction (hysteresis torque) generated by the first friction washer 79 is much smaller than a friction (hysteresis torque) generated by the second friction washer 72.

The first friction washer 85 is arranged between the flange 54 and an inner circumferential portion of the clutch plate 21 so as to be radially outward of the boss 52. The third friction washer 85 is made of for example, resin. The third friction washer 85 comprises chiefly an annular main body 87 and a plurality of engaging sections 88 that extend toward the engine from the main body 87.

The main body 87 touches against an engine-side surface of the hub flange 6 and the flange 54 and a transmission-side surface of the clutch plate 21. The engaging sections 88 pass through holes formed in the clutch plate 21. The third friction washer 85 can rotate as an integral unit with the clutch plate 21 due to the engaging sections 88. The main body 87 engages with a center hole 37 of the clutch plate 21 such that it cannot undergo relative rotation, and an internal circumferential surface of the main body 87 touches against an external circumferential surface of the boss 52 such that the surfaces can slide along each other. Thus, the clutch plate 21 is positioned in a radial direction by the boss 52 through the third friction washer 85.

The first friction washer 79 and the third friction washer 85 constitute a larger friction generating mechanism 14 and the second friction washer 72 and the third friction washer 85 constitute a smaller friction generating mechanism 15. Thus, when the input rotary body 2, the hub flange 6, and the spline hub 3 undergo relative rotation, a hysteresis torque is generated by the larger friction generating mechanism 14 and the smaller friction generating mechanism 15 and torsional vibrations can be effectively attenuated and absorbed by the damper mechanism 4.

(2.4 Cushioning Plate)

The cushioning plate 24 will now be explained with reference to FIG. 8.

Figure 8:
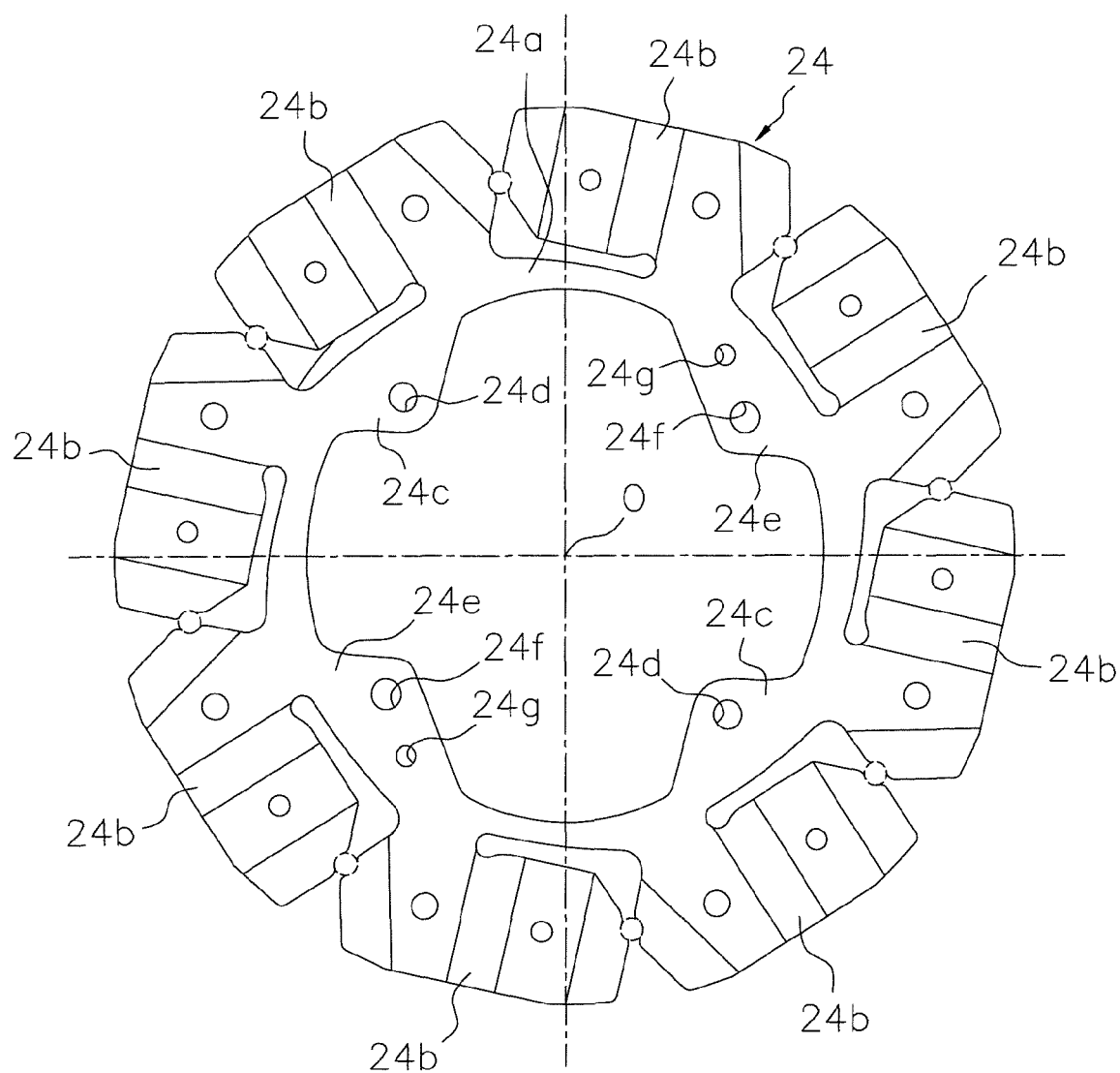
FIG. 8 is a schematic plan view of a cushioning plate.

As shown in FIG. 8, the cushioning plate 24 has an annular section 24a, eight cushioning sections 24b, a pair of first fastening sections 24c, and a pair of second fastening sections 24e.

The cushioning sections 24b are sections to which the friction facing 25 is fixed and are provided to a radially outward side of the annular section 24a. The cushioning sections 24b are arranged at an equal pitch in a rotational direction.

The pair of first fastening sections 24c protrude radially inward from the annular section 24a and are sandwiched axially between the second body section 29 and the fastening sections 33 of the connecting sections 31. The first fastening sections 24c are provided with holes 24d that correspond to the holes 33a of the connecting sections 31 and the holes 29b of the second body section 29.

The pair of second fastening sections 24e protrude radially inward from the annular section 24a and are sandwiched axially between the second body section 29 and the fastening sections 33 of the connecting sections 31. The second fastening sections 24e are provided with holes 24f that correspond to the holes 33a of the connecting sections 31 and the holes 29b of the second body section 29. The second fastening sections 24e are also provided with third holes 24g that are arranged closely adjacent to the holes 24f. The third holes 24g are provided for inserting the positioning pins P and arranged in positions corresponding to the first holes 28a and the second holes 29a.

[3. Arrangement of Connecting Sections]

An arrangement of the connecting sections 31 will now be explained in detail.

As shown in FIG. 3, the four connecting sections 31 are not arranged at the same pitch but arranged such that adjacent pitches are different. In other words, rotational-direction centers of the fastening sections 33 of the connecting sections 31 are arranged such that adjacent pitches there-between are different. For example, an angle A1 formed between two connecting sections 31 arranged on both sides of a first protruding section 45 in a rotational direction is different from an angle A2 formed between two connecting sections 31 arranged on both sides of a second protruding section 46 in a rotational direction. However, the reference (pitch reference) for the angles A1 and A2 is a rotational-direction center of a rivet 27 fastening a fastening section 33 of a connecting section 31 (or a rotational-direction center of a hole 33a through which the rivet 27 is passed). The two connecting sections 31 arranged on an R1 side of the two first protruding sections 45 are arranged opposite each other in such positions that the rotational axis O is disposed there-between. Similarly, the two connecting sections 31 arranged on an R2 side of the two second protruding sections 46 are arranged opposite each other in such positions that the rotational axis O is disposed there-between.

Due to these features, the notches 43 of the hub flange 6 are arranged differently than in a conventional damper mechanism. More specifically, as shown in FIG. 3, the shape of the notches 43 is complimentary to the shape of the corresponding fastening sections 33 and slightly larger than the fastening sections 33. This is so that the fastening sections 33 can pass through the notches 43 in an axial direction during assembly.

Thus, if the connecting sections 31 are arranged such that adjacent pitches thereof are different, then the notches 43 are also arranged such that adjacent pitches thereof are different. As a result, a first window hole 41 arranged in a first region A1 where the pitch of the connecting sections 31 is larger can be made to have a larger dimension in a rotational direction than a second window 42 arranged in a second region A2 where the pitch of the connecting sections is smaller.

For example, as shown in FIG. 3, the four second coil springs 8 have the same size but the first window holes 41 can be configured to have a larger dimension in a rotational direction than the second window holes 42. Consequently, gaps can be secured between the first contact surfaces 44 of the first window holes 41 and the ends of the second coil springs 8 in a rotational direction. Torsional angles corresponding to these gaps are depicted as gap angles $\theta 2p$ and $\theta 2n$. The gap angle $\theta 2p$ corresponds to the gaps formed on the R1 sides of the second coil springs 8, and the gap angle $\theta 2n$ corresponds to the gaps formed on the R2 sides of the second coil springs 8. The gap able $\theta 2p$ is set smaller than the gap angle $\theta 2n$.

Since gaps are secured only in the first window holes 41, this damper mechanism 4 can achieve a two-stage torsion characteristic using the second coil springs 8 as explained later.

As shown in FIG. 3, the positions of a rotational-direction center Q of a contacting section 32 and a rotational-direction center R of a fastening section 33 are different. More specifically, the position of a rotational-direction center Q of a contacting section 32 is offset from a rotational-direction center R of a fastening section 33 corresponding to that contacting section 32 in a direction of a smaller pitch from the perspective of a connecting section 31 corresponding to that contacting section 32. As shown in FIG. 3, for example, if one considers a connecting section 31 arranged on the R1 side of a first protruding section 45, then the rotational-direction center Q of the contacting section 32 is offset in the R1 direction from the rotational-direction R center of the fastening section 33. Thus, using this connecting section 31 as a reference, the rotational-direction center Q of the contacting section 32 is shifted toward an angle A2 where a pitch between adjacent connecting sections 31 is smaller. The same statement applies to the other three connecting sections 31.

Thus, since the positions of the contacting sections 32 are offset from the fastening sections 33 in a rotational direction, the positional relationship of the stopper surfaces 50 and the first protruding section bodies 45a is different than in a conventional damper mechanism. More specifically, in the damper mechanism 4, the two stopper surfaces 50 formed on each of the first contacting sections 49 are arranged farther outward in a rotational direction than the two first contact surfaces 44 formed in the first window holes 41. The stopper surface 50 on the R1 side is arranged farther in the R1 direction than the first contact surface 44 on the R1 side, and the stopper surface 50 on the R2 side is arranged farther in the R2 direction than the first contact surface 44 on the R2 side. Thus, the first contacting sections 49 are longer in a rotational direction than the first window holes 41.

Meanwhile, in order to secure the gap angle $\theta 3p$, the two stopper surfaces 51 formed on each of the second contacting sections 57 are arranged closer inward in a rotational direction than the two second contact surfaces 47 formed in the second window holes 42. More specifically; the stopper surface 51 on the R1 side is arranged more in the R2 direction than the second contact surface 47 on the R1 side and the stopper surface 51 on the R2 side is arranged more in the R1 direction than the second contact surface 47 on the R2 side.

Thus, the second contacting sections 57 are longer in a rotational direction than the second window holes 42.

With the constituent features described above, a radial dimension of the first window holes 41 can be increased and a diameter of the second coil springs 8 corresponding to the first window holes 41 can be increased.

In this explanation, "farther outward in a rotational direction" means farther away from a rotational-direction center of a first protruding section 45, a rotational-direction center of a first contacting section 49, or a rotational-direction center of a first window hole 41 in a rotational direction. In this explanation, "closer inward in a rotational direction" means closer to a rotational-direction center of a second protruding section 46, a rotational-direction center of a second contacting section 57, or a rotational-direction center of a second window hole 42 in a rotational direction. In this embodiment, the rotational-direction centers of the first protruding sections 45, the first contacting sections 49, and the first window holes 41 are coincident and arranged on the first radial centerline L1. Similarly, the rotational-direction centers of the second protruding sections 46, the second contacting sections 57, and the second window holes 42 are coincident and arranged on the second centerline L2.

[4. Mechanical Circuit Diagram]

Figure 9:
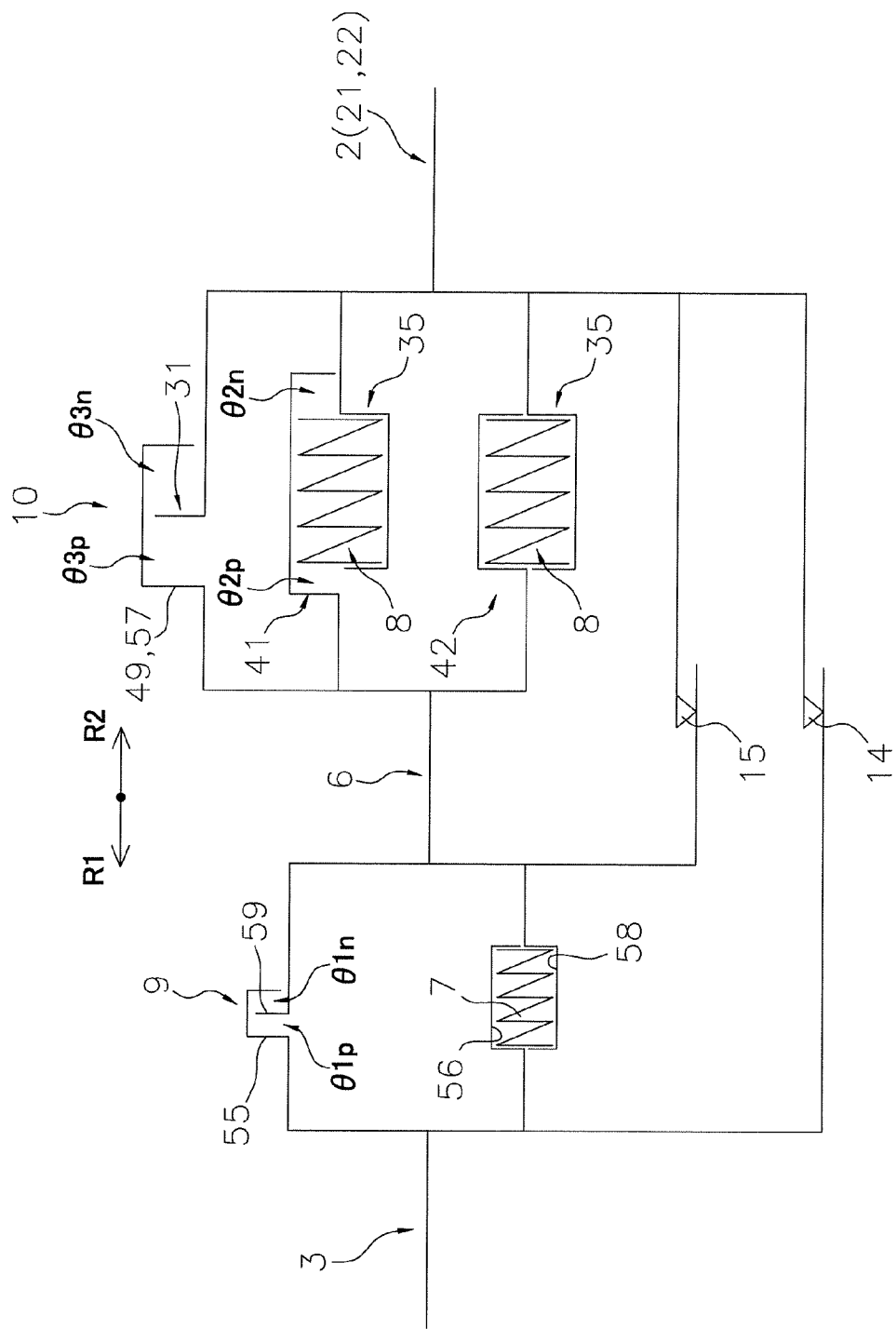
FIG. 9 is a mechanical circuit diagram of a damper mechanism.

A mechanical circuit diagram expressing the damper mechanism 4 is shown in FIG. 9. The mechanical circuit diagram depicts rotational-direction relationships among the members of the damper mechanism in a simplified form. Thus, members that rotate as an integral unit are treated as the same member.

As shown in FIG. 9, the flange 6 is arranged between the input rotary body 2 and the spline hub 3 in a rotational direction. The hub flange 6 is connected to the spline hub 3 elastically in a rotational direction through the first coil springs 7. The first stopper 9 is formed between the hub flange 6 and the spline hub 3. The first coil springs 7 can be compressed within a range of the first gap angles $\theta 1p$ and $\theta 1n$ in the first stopper 9. The hub flange 6 is connected to the input rotary body 2 elastically in a rotational direction through the second coil springs 8. The second stopper 10 is formed between the hub flange 6 and the input rotary body 2. The second coil springs 8 can be compressed within a range of the gap angles $\theta 3p$ and $\theta 3n$ in the second stopper 10. As explained above, the input rotary body 2 and the spline hub 3 are connected together elastically in a rotational direction through the hub flange 6 by means of the first coil springs 7 and the second coil springs 8, which are arranged in series.

The hub flange 6 functions as an intermediate member arranged between the two types of coil springs. In the structure explained heretofore, the first damper comprising the first stopper 9 and the first coil springs 7 (which are arranged in parallel with one another) can be thought of as being arranged in series with respect to the second damper comprising the second stopper 10 and the second coil springs 8 (which are arranged in parallel with one another). The collective stiffness of the coil springs 7 is set to be much smaller than the collective stiffness of the second coil springs 8. Thus, the second coil springs 8 undergo very little compression in a rotational direction at torsional angles ranging up to the first gap angles $\theta 1$ and $\theta 4n$.

[4. Operation]

Figure 10:
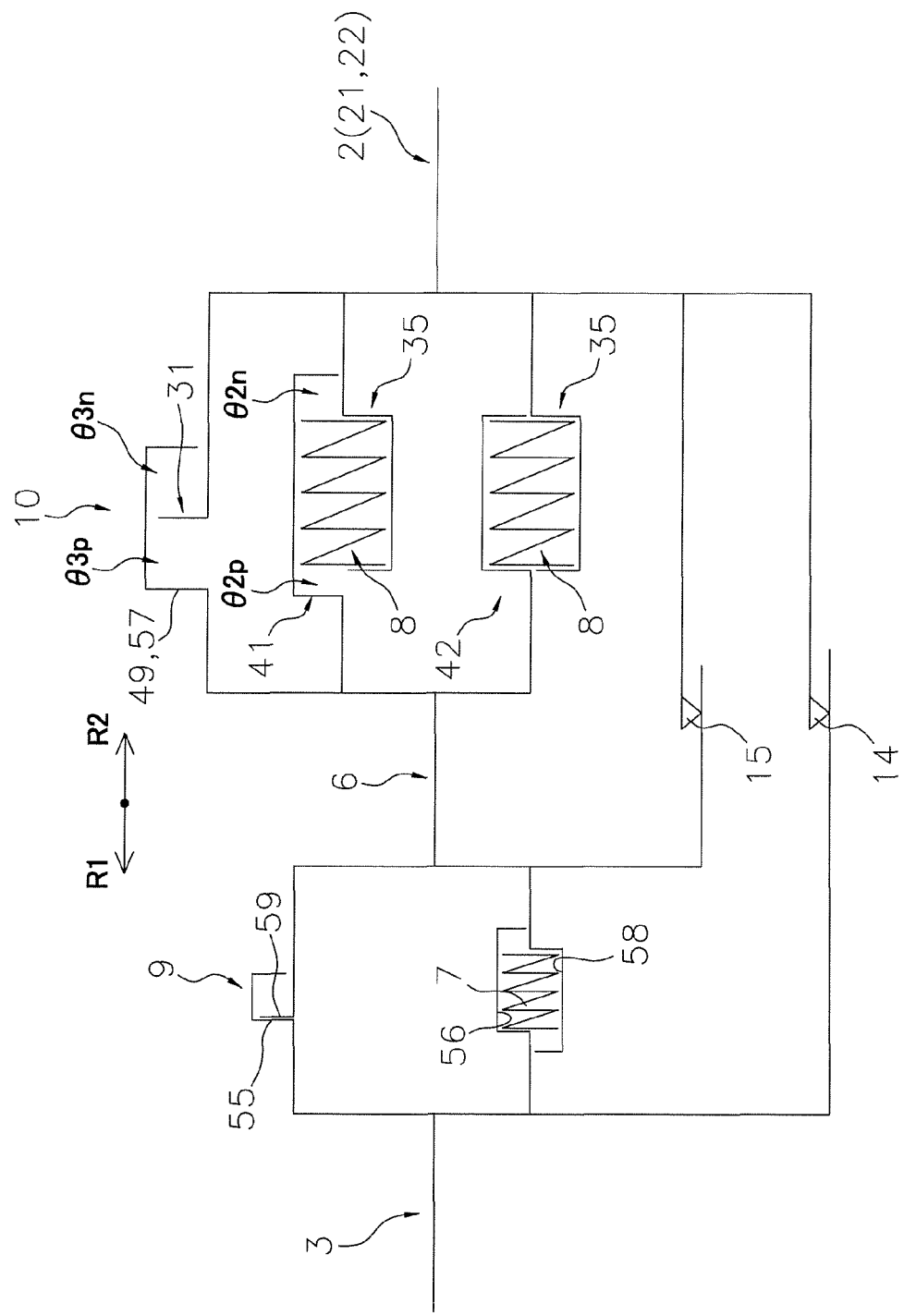
FIG. 10 is a mechanical circuit diagram of a damper mechanism.
Figure 11:
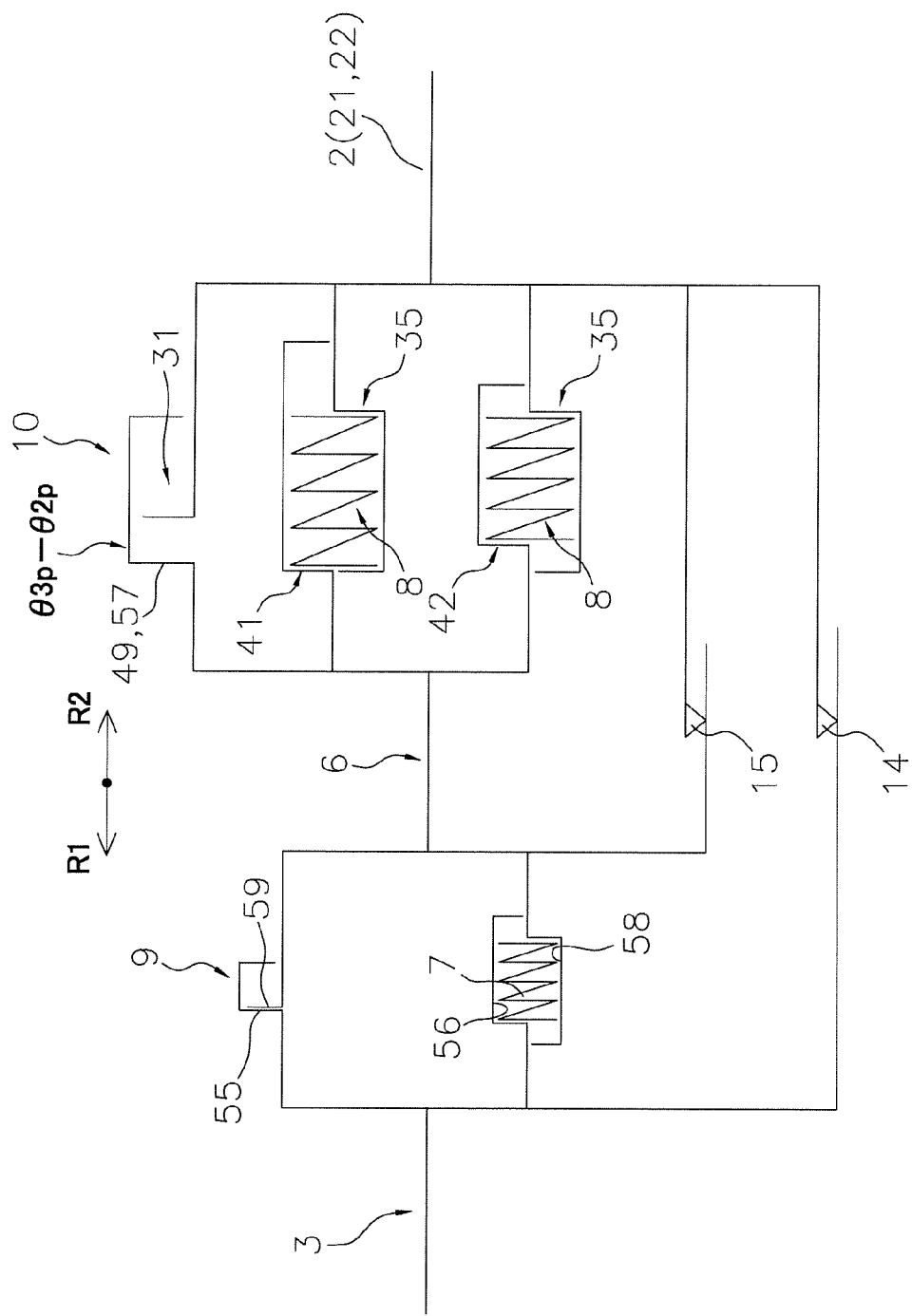
FIG. 11 is a mechanical circuit diagram of a damper mechanism.
Figure 12:
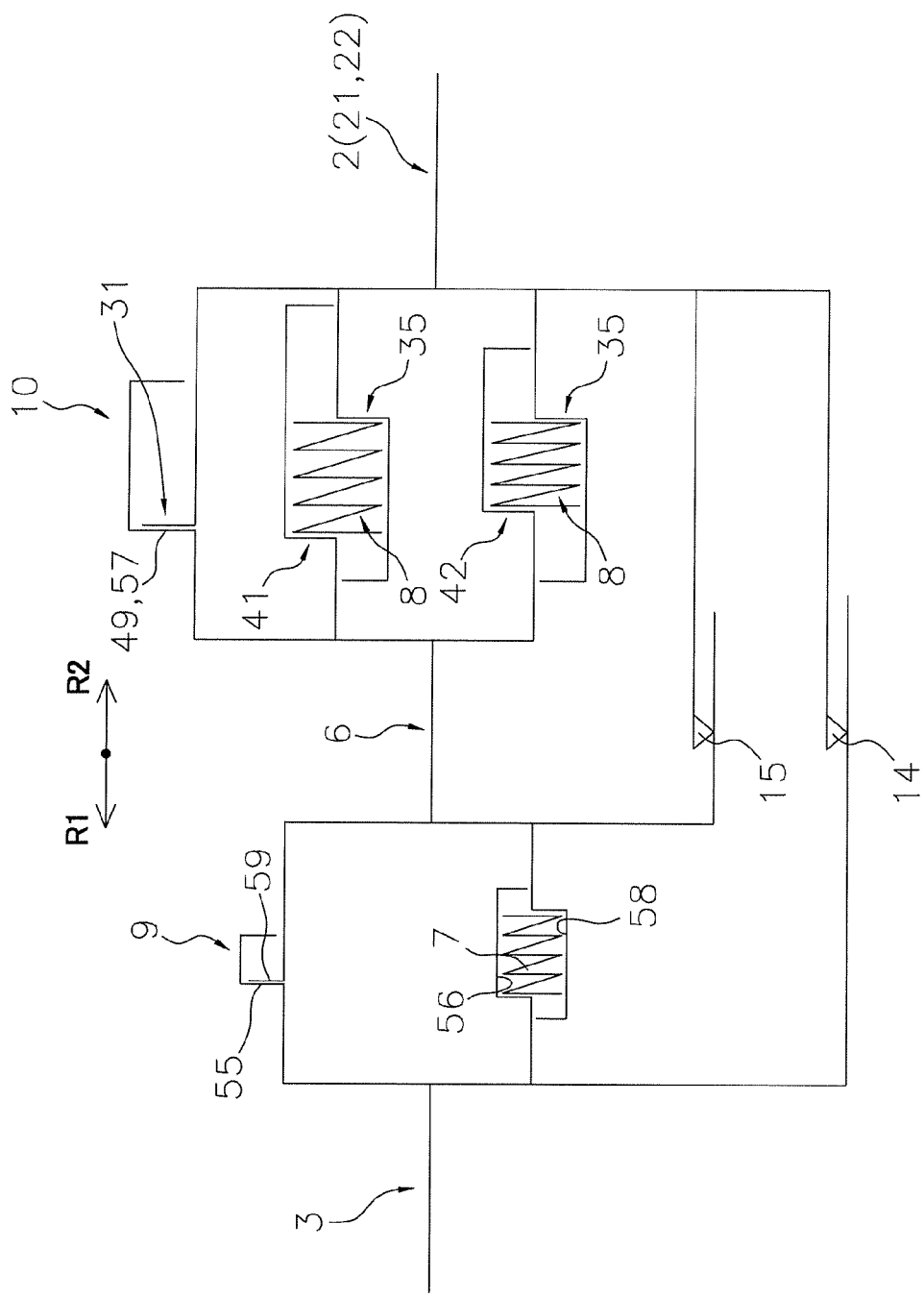
FIG. 12 is a mechanical circuit diagram of a damper mechanism.
Figure 13:
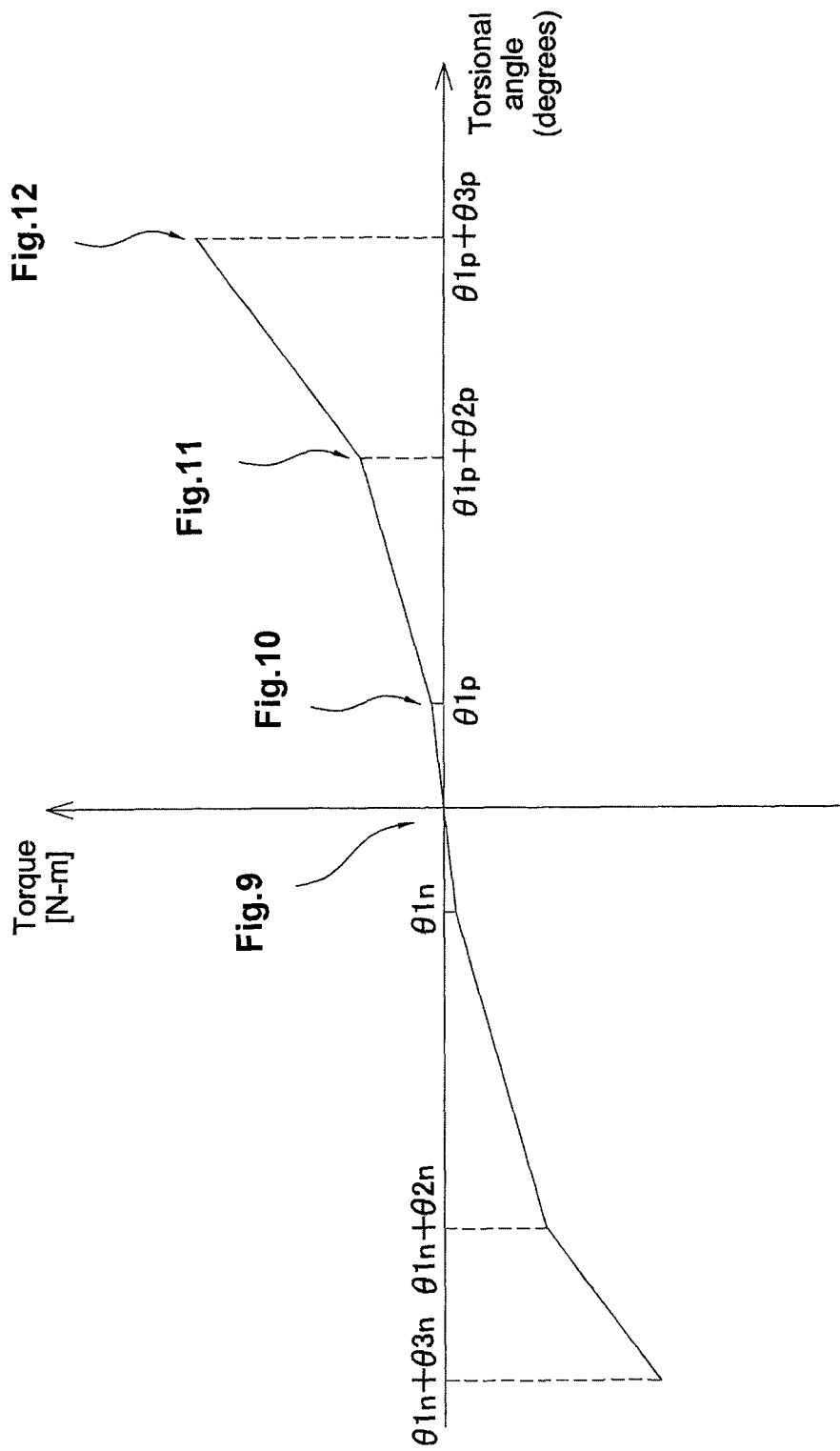
FIG. 13 is a torsional characteristic diagram for a damper mechanism.

The operation and torsional characteristics of the damper mechanism of the clutch disk assembly 1 will now be explained with reference to FIGS. 9 to 13. FIGS. 10 to 12 are mechanical circuit diagrams depicting the damper mechanism in operation and FIG. 13 is a torsional characteristic diagram. The following explanation focuses on a positive torsional characteristic corresponding to when the input rotary body 2 twists in the R1 direction with respect to the spline hub 3 from a neutral state shown in FIG. 9. A similar explanation of a negative torsional characteristic is omitted.

The input rotary body 2 is twisted in the R1 direction, i.e., in a rotational drive direction, with respect to the spline hub 3 from the neutral state shown in FIG. 9. Since the spring constants of the first coil springs 7 are smaller than the spring constants of the second coil springs 8, the second coil springs 8 are not compressed and the first coil springs 7 are compressed between the spline hub 3 and the hub flange 6. The relative rotation between the spline hub 3 and the hub flange 6 causes slippage to occur in the small friction generating mechanism 15. As a result, as shown in FIG. 13, a characteristic of low rigidity and low hysteresis torque is obtained in the range from a torsional angle of 0 to the torsional angle $\theta 1p$. In the state shown in FIG. 10, the external teeth 55 of the flange 54 and the internal teeth 59 of the hub flange 6 contact each other in a rotational direction and the first stopper 9 operates. Consequently, the torsional angle of the input rotary body 2 increases further from the state shown in FIG. 10 and the spline hub 3 and the hub flange 6 rotate as an integral unit.

When the input rotary body 2 is twisted further in the R1 direction from the state shown in FIG. 10, the second coil springs 8 are compressed in a rotational direction between the hub flange 6 and the input rotary body 2. Meanwhile, a gap angle $\theta 2p$ is maintained between the first contact surfaces 44 of the first window holes 41 and end portions of the second coil springs 8. As shown in FIG. 11, only the two second coil springs 8 housed in the second window holes 42 are compressed in a range of torsional angles from $\theta 1p$ to $\theta 1p+\theta 2p$. In this range, the larger friction generating mechanism 14 generates a frictional resistance in addition to a frictional resistance generated by the smaller friction generating mechanism 15.

When the input rotary body 2 is twisted further in the R1 direction from the state shown in FIG. 11, the two coil springs 8 housed in the first window holes 41 are compressed in addition to the two coil springs 8 housed in the second window holes 42. When the torsional angle reaches $\theta 1p+\theta 3p$, the first contacting sections 49 and the second contacting sections 57 touch against the respective connecting sections 31 and 31 and the second stopper 10 operates. Thus, as shown in FIG. 13, in a range from the torsional angle $\theta 1p+\theta 2p$ to the torsional angle $\theta 1p+\theta 3p$, this damper mechanism exhibits a three-stage torsional characteristic. Then, when the torsional angle reaches $\theta 1p+\theta 3p$, the input rotary body 2, the hub flange 6, and the spline hub 3 rotate as an integral unit and torque imparted to the input rotary body 2 is outputted from the spline hub 3.

As explained above, this clutch disk assembly 1 exhibits a three-state torsional characteristic due to the first coil springs 7, the second coil springs 8, and the gap angles $\theta 1p$, $\theta 2p$, and $\theta 3p$.

[5. Assembly of Clutch Disk Assembly]

The work of assembling the clutch disk assembly 1 will now be explained. An assembly tool (not shown) is used to assembly the clutch disk assembly 1. The tool is designed such that the rotational axis O of the clutch disk assembly 1 is oriented substantially parallel to a vertical direction. Positioning pins P are set in the tool.

Firstly, four rivets 27 are set in the tool. After the rivets 27 are set, the retaining plate 22 is set on the tool such that the rivets 27 are inserted through the holes 33a and the holes 34 of the retaining plate 22. Since the positioning pins P are set in the tool, it is necessary to set the retaining plate 22 in such an orientation that the positioning pins P are inserted into the first holes 28a of the retaining plate 22. Thus, the positioning pins P prevent the retaining plate 22 from being set wrong side up.

Next, the first cone spring 80, the second cone spring 73, the first friction washer 79, and the second friction washer 72 are installed onto the retaining plate 22. Then the hub flange 6 is installed onto an upward side of the retaining plate 22. The first holes 28a are arranged closely adjacent to first protrusions 45 of the hub flange 6 along a rotational direction. More specifically, when the hub flange 6 is installed with a correct mounting angle with respect to the retaining plate 22, the first holes 28a are positioned such that the positioning pins P touch against the first protruding sections 45 in a rotational direction. Thus, the positioning pins P enable the hub flange 6 to be positioned and make it easier to arrange the hub flange 6 in a correct position with respect to the retaining plate 22. As a result, it is easier to insert the second coil springs 8 into the first window holes 41 and the second window holes 42 in a subsequent step.

The first protruding sections 45 of the hub flange 6 have projections 45b and the projections 45b will hit against the positioning pins P if the hub flange 6 is attached wrong side up to the retaining plate 22. Even if the hub flange 6 is installed wrong side up such that the projections 45b do not hit against the positioning pins P, the projections 45b will hit against the positioning pins P in a rotational direction such that the positions of the first window holes 41 do not align with the holding sections 35 and the positions of the second window holes 42 do not align with the holding sections 35 in a rotational direction. As a result, the second coil springs 8 cannot be inserted into the first window holes 41 and the second window holes 42 in a step for installing the second coil springs 8. Thus, by providing the projections 45b, the hub flange 6 can be reliably prevented from being attached to the retaining plate 22 wrong side up.

After the hub flange 6 is installed, the first coil springs 7 and the spline hub 3 are attached to the hub flange 6. After that, two second coil springs 8 are inserted into the second window holes 42. Since the hub flange 6 is arranged at the correct angle due to the positioning pins P, the second coil springs 8 can be installed easily. Since a rotational-direction dimension of the second window holes 42 is substantially the same as a free length of the second coil springs 8, the hub flange 6 is positioned with respect to the retaining plate 22 by installing the second coil springs 8 into the second window holes 42.

After the two second coil springs 8 are installed, the clutch disk 23 is installed onto the retaining plate 22 such that the rivets 27 are inserted into the holes 24d and the holes 24f. The clutch disk 23 can be prevented from being installed wrong side up because it is necessary to place the clutch disk 23 onto the retaining plate 22 in such an orientation that the positioning pins P are inserted through the third holes 24g of the cushioning plate 24.

After the clutch disk 23 is installed, the remaining two second coil springs 8 are installed into the first window holes 41. Then, the clutch plate 21 is attached to the retaining plate 22 such that the rivets 27 are inserted into the holes 29b. The clutch plate 21 can be prevented from being installed wrong side up because it is necessary to place the clutch disk 21 onto the retaining plate in such an orientation that the positioning pins P are inserted through the second holes 29a. The third friction washer 85 is attached to the clutch plate 21 in advance.

After the clutch plate 21 is installed, the end portions of the rivets 27 are crimped to complete the work of assembling the clutch disk assembly 1.

[5. Distinctive Features of Clutch Disk Assembly]

Distinctive features of the clutch disk assembly 1 described heretofore will now be presented.

(1)

With this clutch disk assembly 1, since the first holes 28a into which the positioning pins P can be inserted are arranged closely adjacent to the first protruding sections 45 in a rotational direction, the hub flange 6 can be easily set to a correct position (mounting angle) with respect to the retaining plate 22 by attaching the hub flange 6 to the retaining plate 22 such that the positioning pins P touch against the first protruding sections 45 in a rotational direction. In this way, the work of assembling the clutch disk assembly 1 can be accomplished with increased efficiency.

(2)

In this clutch disk assembly 1, projections 45b are arranged in positions where they will overlap at least partially with the second holes 29a if the hub flange 6 is installed wrong side up with respect to the retaining plate 22. Consequently, if the hub flange 6 is installed wrong side up with respect to the retaining plate 22, then the projections 45b will hit against the positioning pins P inserted through the second holes 29 such that the hub flange 6 cannot be set to a correct position (mounting angle). Thus, a worker can easily recognize that the hub flange 6 has been installed wrong side up and assembly mistakes can be prevented.

The dimensions of the projections 45b are set such that the projections overlap at least half of the first holes 28a and the rotational-direction dimensions of the second window holes 42 are substantially the same as the free lengths of the second coil springs 8. Consequently, the second coil springs 8 cannot be installed into the second window holes 42 if the hub flange 6 is installed wrong side up. As a result, a worker can recognize an assembly mistake at this stage of the assembly work.

(3)

With this clutch disk assembly 1, since the clutch plate 21 has second holes 29a, the clutch plate 21 can be prevented from being installed wrong side up with respect to the retaining plate 22.

(4)

With this clutch disk assembly 1, since the first holes 28a are arranged farther inward in a radial direction than the first contacting sections 49 of the hub flange 6, a portion other than the first contacting sections 49, i.e., the first protruding section bodies 45a, can be used to position the hub flange 6. As a result, damage to the first contacting section 49 can be prevented during assembly.

[6. Other Embodiments]

The specific constituent features of the present invention are not limited to those of the previously described embodiment and various modifications and revisions can be made without departing from the scope of the invention as defined in the claims.

(A)

Although the previously explained embodiment presents an example in which the damper mechanism 4 is installed in a clutch disk assembly 1, the invention is not limited to such an application. For example, this damper mechanism 4 can also be used in a two-mass flywheel, a lockup device of a fluid-type torque transmitting device, or other power transmitting device.

(B)

Although in the previously explained embodiment first holes 28a are formed in the retaining plate 22 and second holes 29a are formed in the clutch plate 21 as holes for the positioning pins P, it is acceptable to provide only one of these sets of holes (e.g., the first holes 28a).

(C)

The projections 45b should overlap at least a portion of the first holes 28a and the second holes 29a. Likewise, it is acceptable for the projections 45b to overlap the entirety of the first holes 28a and the second holes 29a.

INDUSTRIAL APPLICABILITY

A damper mechanism according to the present invention enables assembly work to be accomplished with a higher degree of efficiency. Thus, the present invention is applicable to a power train.

What is claimed is:

1. A damper mechanism for a clutch, comprising:
   a first rotary body having a first member, a second member, and first and second connecting sections, the first rotary body being rotatably configured to be rotated in a rotational direction around an axial direction along a rotational axis, the second member being configured adjacent to the first member in the axial direction, the first and second connecting sections connecting the first member and the second member, the first member having a first rivet hole, the second member having a second rivet hole;
   a second rotary body being configured between the first and second members in the axial direction and rotatably configured relative to the first rotary body;
   an elastic member being rotatably configured between the first and second connecting sections to connect the first and second rotary bodies elastically;
   a rivet being configured in the first and second rivet holes to fix the first member to the second member,
   the second rotary body including first and second protruding sections being arranged between the first and second connecting sections such that the first and second protruding sections contact the connecting sections,
   the first member including a pair of first holes being configured with the rotational axis between the first holes for positioning pins being inserted in the first holes during an assembly,
   the first holes being configured adjacent to the first and second protruding sections in the rotational direction,
   the first and second rivet holes being configured apart from the first holes when the first holes are viewed in a direction to which the rotation axis extends.

2. The damper mechanism according to claim 1, wherein
   the first protruding section includes a first protruding section body including an opening in which the elastic member is housed, and a projection that protrudes in the rotational direction from the first protruding section body at a first end of the first protruding section, and
   the first protruding section is arranged to be in contact at a second end of the first protruding section, which is opposite to the first end, with one of the positioning ping of one of the first holes when the second rotary body is on the first member.

3. The damper mechanism according to claim 1, wherein
   the second member includes a pair of second holes being configured for the positioning pins being inserted in the second holes during the assembly and arranged in such positions as to face opposite the first holes in the axial direction.

4. The damper mechanism according to claim 1, wherein
   the first protruding section includes a contacting section being configured to contact the first connecting section, and
   the first holes are configured closer to a center of rotation of the second rotary body than the contacting section to the center of the rotation.

5. The damper mechanism according to 1, wherein
   the first rotary body includes a third connection section connecting the first member and the second member,
   the first connecting section is next to the second connecting section,
   the third connecting section is next to the second connecting section,
   a first space between the first and second connecting sections is different from a second space between the second and third connecting sections, and
   the first and second protruding sections are configured in one of the first and second spaces which is larger than the other.

6. The damper mechanism according to claim 5, wherein
   the first connecting section includes a contacting section that extends from the first member in the axial direction and a fastening section that extends from an end portion of the contacting section to a center of rotation of the second rotary body,
   the fastening section is configured to be fastened on the second member;
   each of the first holes is configured between the fastening section and first and second protruding sections.

7. The damper mechanism according to claim 6, wherein
   a center of the contacting section in the rotational direction is offset from a center of the fastening section in a direction away from the first holes.

* * * * *